United States Patent [19]

Baker

[11] Patent Number: 5,370,387

[45] Date of Patent: Dec. 6, 1994

[54] GOLF BALL/FLUORESCENT OBJECT LOCATOR

[76] Inventor: Gene G. Baker, 315 5th Ave. West, Hazen, N. Dak. 58545

[21] Appl. No.: 75,831

[22] Filed: Jun. 14, 1993

[51] Int. Cl.[5] ............................................. A63B 57/00
[52] U.S. Cl. ................................. 273/32 B; 273/213; 294/19.2
[58] Field of Search ............. 273/32 B, 213, DIG. 24, 273/32 F; 294/19.2

[56] References Cited

U.S. PATENT DOCUMENTS

| 3,918,719 | 11/1975 | Welch | 273/213 |
|---|---|---|---|
| 4,991,851 | 2/1991 | Melesio | 273/213 |
| 5,007,647 | 4/1991 | Gulick | 273/213 |
| 5,132,622 | 7/1992 | Valentino | 273/213 |
| 5,228,697 | 6/1993 | Gulick et al. | 273/213 |

FOREIGN PATENT DOCUMENTS

| 3926684 | 2/1991 | Germany | 273/213 |
|---|---|---|---|
| 1121630 | 7/1968 | United Kingdom | 273/213 |
| 2188415 | 9/1987 | United Kingdom | 273/213 |

*Primary Examiner*—Jessica J. Harrison

[57] ABSTRACT

A new and improved golf ball/fluorescent object locator includes a UV light source assembly. A rigid support member is connected to the UV light source assembly and extends upward and rearward from the UV light source assembly. A handle member is connected to the rigid support member, for permitting the UV light source assembly to be controlled by a person holding the handle member. The UV light source assembly includes a housing connected to the rigid support member, a battery assembly housed within the housing, a UV source powered by the battery assembly and housed within the housing, and a UV transparent lens structure, attached to the housing at a bottom portion of the housing, for permitting UV light to pass from the UV source to outside the UV light source assembly to below the UV light source assembly. The battery assembly may include rechargeable batteries. A reflector assembly is positioned above and behind the UV source and reflects UV light through the UV transparent lens structure to outside the UV light source assembly. The rigid support member extends downward and forward from the handle member toward the UV light source assembly at a first predetermined angle. The rigid support member extends upward and rearward from the UV light source assembly toward the handle member at a second predetermined angle. The first predetermined angle and the second predetermined angle are equal to each other and are equal to approximately 135 degrees.

15 Claims, 4 Drawing Sheets

GOLF BALL/FLUORESCENT OBJECT LOCATOR

BACKGROUND OF THE INVENTION

1. Field of the Invention

The present invention relates generally to devices for locating lost objects, and more particularly, to a device especially adapted for locating objects that fluoresce when exposed to ultraviolet (UV) radiation.

2. Description of the Prior Art

A number of technologies are employed for locating lost objects. Which technology is employed depends on a number of factors, the primary factor being the object itself. For example, for locating lost metal objects, metal detectors are employed.

An object that is commonly lost is a golf ball. Golf balls are often hit into rough areas where visibility for the balls is greatly obscured. Moreover, golf balls are often hit great distances, and it is difficult to completely follow such long hit balls. Furthermore, it is especially difficult to locate lost golf balls in low light level conditions such as at dusk and at dawn. In this respect, it would be desirable if a golf ball locating device were provided which enables locating lost golf balls in low light level conditions.

The problem of losing golf balls is one that has been recognized for years, and a number of solutions to the problem are disclosed in the prior art as represented by the following U.S. Pat. Nos. 3,458,205; 4,695,055; 4,798,386; 4,878,674; and 4,991,851. More specifically, U.S. Pat. Nos. 3,458,205, 4,695,055, and 4,878,674 respectively disclose golf balls that include internal sources of illumination. A number of problems are associated with golf balls having an internal source of illumination. It is quite expensive and technically complex to provide a golf ball having an internal source of illumination that can withstand the powerful concussion of being struck by a rapidly swung golf club. It is also difficult to provide an internally illuminated golf ball that is dynamically balanced. With an internally illuminated golf ball, there are numerous components associated with the illumination system. There are, of course, numerous components composing the ball itself. Many of these components have different shapes, sizes, and densities. These complex parameters make dynamically balancing an internally illuminated golf ball very difficult.

Another problem associated with an internally illuminated golf ball is the intensity of the light that the ball can emit. It is very difficult to engineer an adequately intense light source within the small confines of a regulation golf ball.

In this respect, it would be desirable if a golf ball locating device were provided that did not depend upon the use of internally illuminated golf balls.

U.S. Pat. No. 4,798,386 discloses a golf ball with a fluorescent cover. Having a fluorescent cover for a golf ball is a practical approach to locating lost golf balls and avoids the problems associated with internally illuminated golf balls. However, the use of golf balls with a fluorescent cover begs questions as to a source of UV light for illuminating the golf balls to activate fluorescence.

U.S. Pat. No. 4,991,851 discloses the use of reflective golf balls and a source of visible light used for finding the reflective balls. The balls are made reflective by using a solid coating of reflective glass beads. A number of problems are associated with the use of reflective glass beads. Individual glass beads can be knocked off the ball causing the ball to become dynamically unbalanced. The beads can be crushed by the high impact forces of a golf club hitting the ball. Fragments of broken glass beads pose a health threat. The can be very damaging if they get into a golfer's eye. In this respect, it would be desirable if a device were provided for locating lost golf balls that did not used glass beads applied to the ball.

With respect to a UV light source for locating golf balls that exhibit fluorescence upon exposure to UV light, several features are thought to be desirable. Since lost golf balls almost invariably rest upon ground level when they come to a stop, it would be desirable if the source of UV light were close to the ground. In this respect, it would also be desirable if the UV light source directed the UV light toward the ground; this would be efficient in the use of the UV light.

Continuous or intense exposure to sources of UV light can be deleterious to the health of a person exposed to such light. This is especially true of exposure of the eyes to UV light. In this respect, it would be desirable if a UV light source were provided which minimized the exposure of a user's eyes to the UV light.

With a UV light source, although the source of light itself should be located near the ground, support for the light source and control of the light source would preferably be at hand level for a hand-held device. In this respect, it would be desirable if a UV light device were provided which had controls for the light located in a hand-held device.

The use of fluorescent golf balls and a UV light source is especially useful under dim light conditions because, under such conditions, a fluorescent golf ball would appear to glow when exposed to the UV light. However, under low light conditions, it is more difficult for the user of the device to see the surroundings. Unfortunately, the UV light does not provide normal illumination of the dark. For this, visible light is needed. In this respect, it would be desirable if a UV light source device were provided which contained both a UV light source and a source of visible light.

Once a lost golf ball is found, it is then required to physically retrieve the ball off of the ground. The user of the UV light containing search device is generally standing and holding the handle of the device at waist high level. It would be very inconvenient and awkward to then have to bend down to retrieve the ball. By bending down, one may have to let go of the handle of the UV light source, thereby losing control of the visible light source which is connected to the handle of the UV light source. In these respects, it would be desirable if the UV light source were provided with a device that permitted the user to retrieve a found ball without bending down and without letting go of the handle of the UV light source.

Often more that one golf ball is lost during a round of golf, and, consequently, more that one lost golf ball may be found. In this respect, it would be desirable if a UV light source were provided that permitted retrieval of more than one golf ball without bending down and without letting go of the handle of the UV light source.

When a person looks for something on the ground, one generally looks at locations on the ground that are in front of the person by a few feet or more. This permits the person to both look generally ahead and at the ground in front of the person. In this respect, it would be desirable if a UV light source were provided which had a handle which positioned the UV light source a few feet in front of the user.

Other objects besides golf balls may be fluorescent in the presence of UV light. In this respect, it would be desirable if a UV light source were provided that was useful generally for locating objects that fluoresce upon exposure to UV light.

Thus, while the foregoing body of prior art indicates it to be well known to use fluorescent golf balls, the prior art described above does not teach or suggest a fluorescent object locator which has the following combination of desirable features: (1) enables locating lost golf balls in low light level conditions such as dusk or night time; (2) does not depend upon the use of internally illuminated golf balls; (3) does not used glass beads applied to the ball; (4) provides a source of UV light that is close to the ground; (5) directs UV light toward the ground; (6) provides a UV light source which minimizes the exposure of a user's eyes to the UV light; (7) has controls for the UV light source located in a handheld device; (8) contains both a UV light source and a source of visible light; (9) permits the user to retrieve a found ball without bending down and without letting go of the handle of the UV light source; (10) permits retrieval of more than one golf ball without bending down and without letting go of the handle of the UV light source; (11) has a handle which positions the UV light source a few feet in front of the user; and (12) is useful generally for locating objects that fluoresce upon exposure to UV light. The foregoing desired characteristics are provided by the unique golf ball/fluorescent object locator of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved golf ball/fluorescent object locator which includes a UV light source assembly. A rigid support member is connected to the UV light source assembly and extends upward and rearward from the UV light source assembly. A handle member is connected to the rigid support member, for permitting the UV light source assembly to be controlled by a person holding the handle member. The UV light source assembly includes a housing connected to the rigid support member, a battery assembly housed within the housing, a UV source powered by the battery assembly and housed within the housing, and a UV transparent lens structure, attached to the housing at a bottom portion of the housing, for permitting UV light to pass from the UV source to outside the UV light source assembly to below the UV light source assembly. The battery assembly may include rechargeable batteries. A reflector assembly is positioned above and behind the UV source and reflects UV light through the UV transparent lens structure to outside the UV light source assembly.

The rigid support member extends downward and forward from the handle member toward the UV light source assembly at a first predetermined angle with respect to the handle member. The rigid support member extends upward and rearward from the UV light source assembly toward the handle member at a second predetermined angle with respect to the UV light source assembly. The first predetermined angle and the second predetermined angle are selected such that the UV light source assembly and the handle member are located in parallel planes. The first predetermined angle and the second predetermined angle are equal to each other. The first predetermined angle and the second predetermined angle are approximately 135 degrees. The rigid support member may include a front portion which is located in a plane parallel to a plane in which the UV light source assembly is located. The rigid support member may include a rear portion which is located in a plane parallel to a plane in which the handle member is located.

A visible light source assembly, supported by the rigid support member, provides visible light. The visible light source assembly is connected to the rear portion of the rigid support member. The visible light source assembly is supported in a plane that is parallel to a plane in which the handle member is located. The visible light source assembly may be a battery-powered flashlight.

A ball recovery assembly, connected to the UV light source assembly, is used for lifting and retaining a ball. The ball recovery assembly includes a housing and a support strut connected between the housing and the UV light source assembly. The support strut supports the ball recovery assembly on the UV light source assembly. An expandable, resilient valve member is located at a bottom portion of the housing. The valve member is capable of being in a relaxed state and in a stretched state, such that a ball can be pressed against the valve member when in a relaxed state. The ball can stretch the valve member to the stretched state. The ball can pass through the valve member in the stretched state, and the valve member can return to the relaxed state, whereby the ball is retained within the housing of the ball recovery assembly by the valve member in the relaxed state. The housing can retain a plurality of balls. Pressure exerted on the expandable, resilient valve member by the ball results from weight of the UV light source assembly bearing down on the ball when the ball is positioned next to and under the expandable, resilient valve member.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least three preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved golf ball/fluorescent object locator which has all of the advantages of the prior art and none of the disadvantages.

It is another object of the present invention to provide a new and improved golf ball/fluorescent object locator which may be easily and efficiently manufactured and marketed.

It is a further object of the present invention to provide a new and improved golf ball/fluorescent object locator which is of durable and reliable construction.

An even further object of the present invention is to provide a new and improved golf ball/fluorescent object locator which is producible at a low cost of manufacture with regard to both materials and labor, and which accordingly is then marketable at low prices of sale to the consuming public, thereby making such golf ball/fluorescent object locator available to the buying public.

Still yet a further object of the present invention is to provide a new and improved golf ball/fluorescent object locator which enables locating lost golf balls in low light level conditions such as dusk or night time.

Yet another object of the present invention is to provide a new and improved golf ball/fluorescent object locator which does not depend upon the use of internally illuminated golf balls.

Even another object of the present invention is to provide a new and improved golf ball/fluorescent object locator that does not used glass beads applied to the ball.

Still a further object of the present invention is to provide a new and improved golf ball/fluorescent object locator which provides a source of UV light that is close to the ground.

Yet another object of the present invention is to provide a new and improved golf ball/fluorescent object locator that directs UV light toward the ground.

Still another object of the present invention is to provide a new and improved golf ball/fluorescent object locator which provides a UV light source which minimizes the exposure of a user's eyes to the UV light.

Yet another object of the present invention is to provide a new and improved golf ball/fluorescent object locator which has controls for the UV light source located in a hand-held device.

Still a further object of the present invention is to provide a new and improved golf ball/fluorescent object locator that contains both a UV light source and a source of visible light.

Yet another object of the present invention is to provide a new and improved golf ball/fluorescent object locator which permits the user to retrieve a found ball without bending down and without letting go of the handle of the UV light source.

Still a further object of the present invention is to provide a new and improved golf ball/fluorescent object locator that permits retrieval of more than one golf ball without bending down and without letting go of the handle of the UV light source.

Yet another object of the present invention is to provide a new and improved golf ball/fluorescent object locator which has a handle which positions the UV light source a few feet in front of the user.

Still a further object of the present invention is to provide a new and improved golf ball/fluorescent object locator that is useful generally for locating objects besides golf balls that fluoresce upon exposure to UV light.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
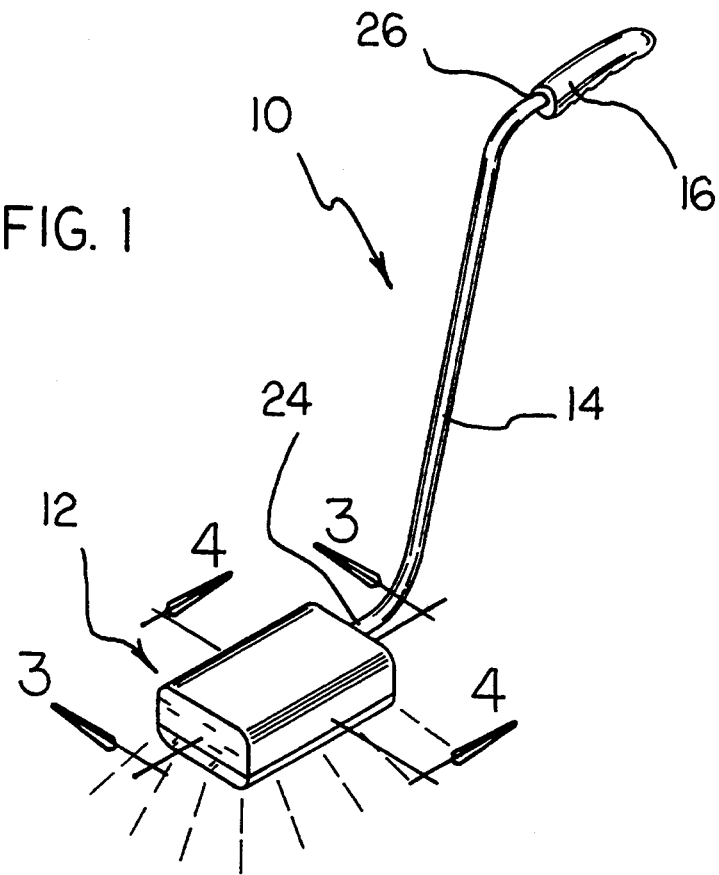
FIG. 1 is a perspective view showing a first preferred embodiment of the golf ball/fluorescent object locator of the invention.
Figure 2:
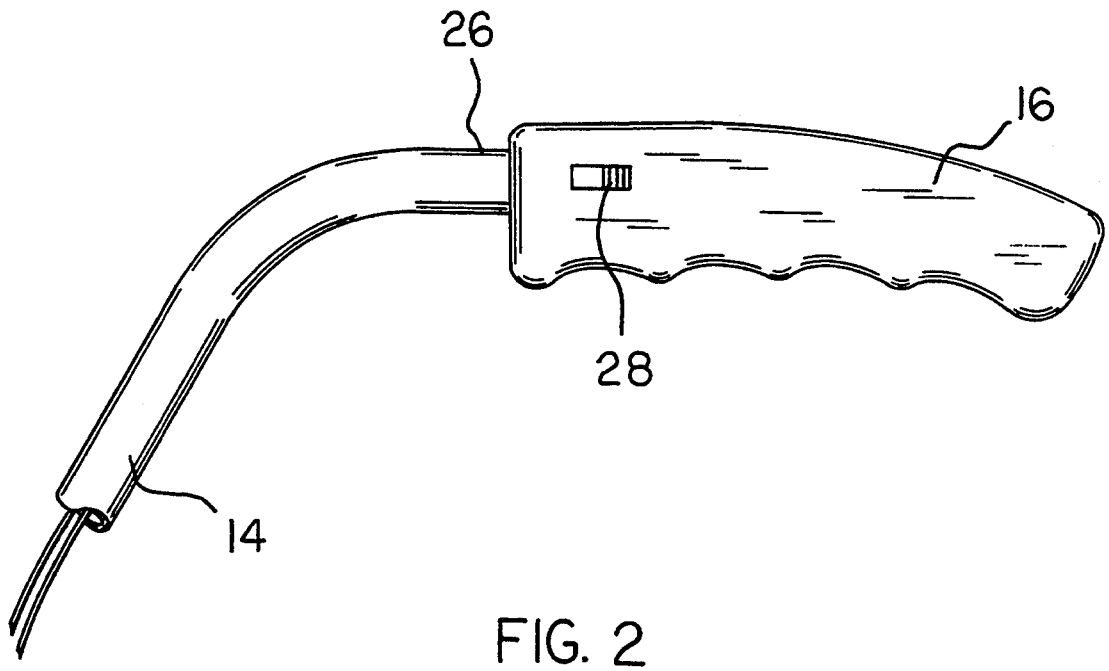
FIG. 2 is an enlarged side view of the handle portion of the embodiment shown in FIG. 1.
Figure 3:
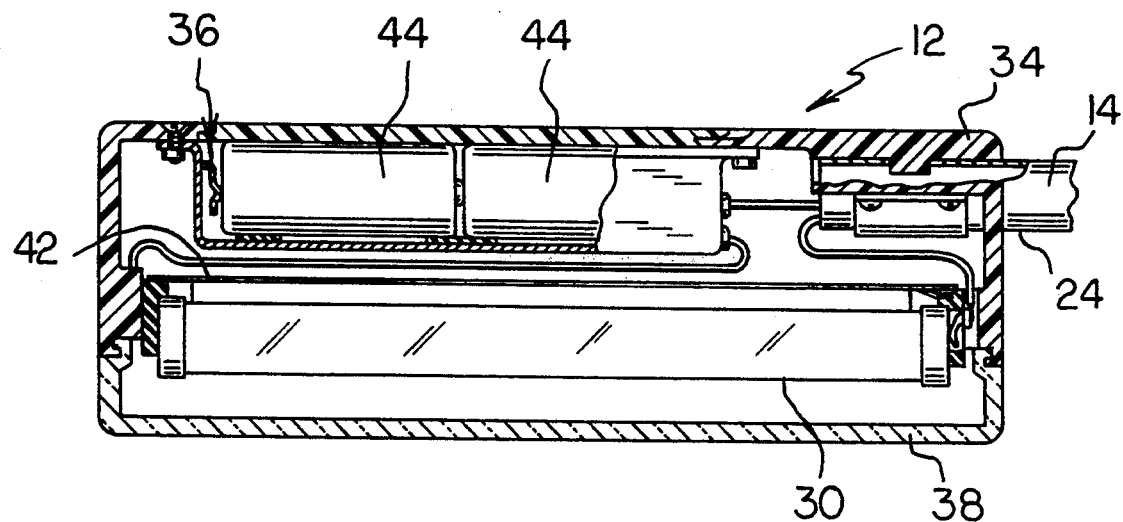
FIG. 3 is a cross-sectional view of the portion of the golf ball/fluorescent object locator taken along line 3—3 in FIG. 1.
Figure 4:
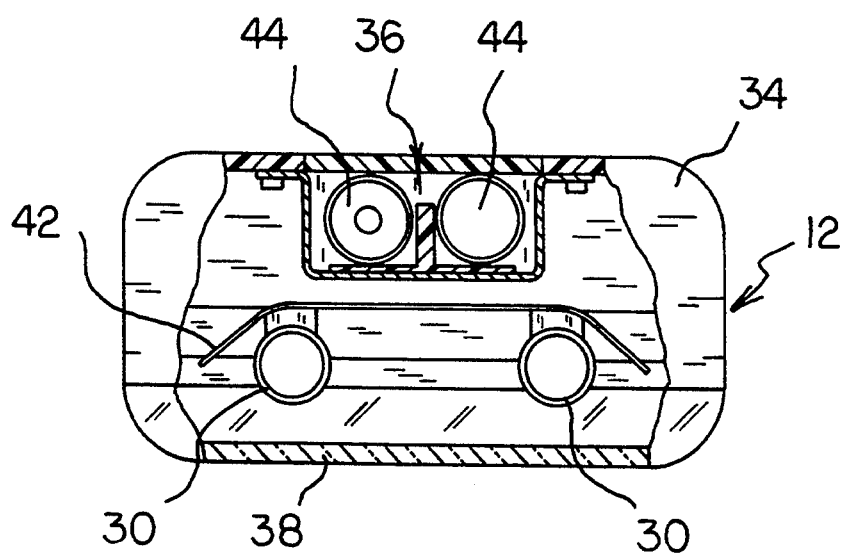
FIG. 4 is a cross-sectional view of the portion of the golf ball/fluorescent object locator taken along line 4—4 in FIG. 1.

With reference to the drawings, a new and improved golf ball/fluorescent object locator embodying the principles and concepts of the present invention will be described.

Turning initially to FIGS. 1–4, there is shown a first exemplary embodiment of the golf ball/fluorescent object locator of the invention generally designated by reference numeral 10. In its preferred form, golf ball/fluorescent object locator 10 includes a UV light source assembly 12. A rigid support member 14 is connected to the UV light source assembly 12 and extends upward and rearward from the UV light source assembly 12. A handle member 16 is connected to the rigid support member 14, for permitting the UV light source assembly 12 to be controlled by a person holding the handle member 16. The handle member 16 includes an on/off switch 28 for controlling electric power to a UV source 30 in the UV light source assembly 12. More specifically, two UV light sources 30 are shown.

Many oils, minerals, coatings and white objects become fluorescent and give off bright visible light when exposed to UV light both in dim light or in darkness. The fluorescence is spectacular. With respect to a golf ball, when UV light strikes the golf ball, the jacket on the ball glows brightly, revealing the presence of the ball to searchers.

The UV light source assembly 12 includes a housing 34 connected to the rigid support member 14, a battery assembly 36 housed within the housing 34, a UV source 30 powered by the battery assembly 36 and housed within the housing 34, and a UV transparent lens structure 38, attached to the housing 34 at a bottom portion of the housing 34, for permitting UV light to pass from the UV source 30 to outside the UV light source assembly 12 to below the UV light source assembly 12. The battery assembly 36 may include rechargeable batteries 44. Electrical conductors connect the on/off switch 28 to the battery assembly 36 and the UV sources 30 for controlling electric power from the battery assembly 36 to the UV sources 30. A reflector assembly 42 is positioned above and behind the UV source 30 and reflects UV light through the UV transparent lens structure 38 to outside the UV light source assembly 12.

The rigid support member 14 extends downward and forward front the handle member 16 toward the UV light source assembly 12 at a first predetermined angle 18, (see FIG. 5), with respect to the handle member 16. The rigid support member 14 extends upward and rearward from the UV light source assembly 12 toward the handle member 16 at a second predetermined angle 20, (see FIG. 5), with respect to the UV light source assembly 12. The first predetermined angle 18 and the second predetermined angle 20 are selected such that the UV light source assembly 12 and the handle member 16 are located in parallel planes. The first predetermined angle 18 and the second predetermined angle 20 are equal to each other. The first predetermined angle 18 and the second predetermined angle 20 are approximately 135 degrees.

The rigid support member 14 includes a front portion 24 which is located in a plane parallel to a plane in which the UV light source assembly 12 is located. The rigid support member 14 includes a rear portion 26 which is located in a plane parallel to a plane in which the handle member 16 is located.

Figure 5:
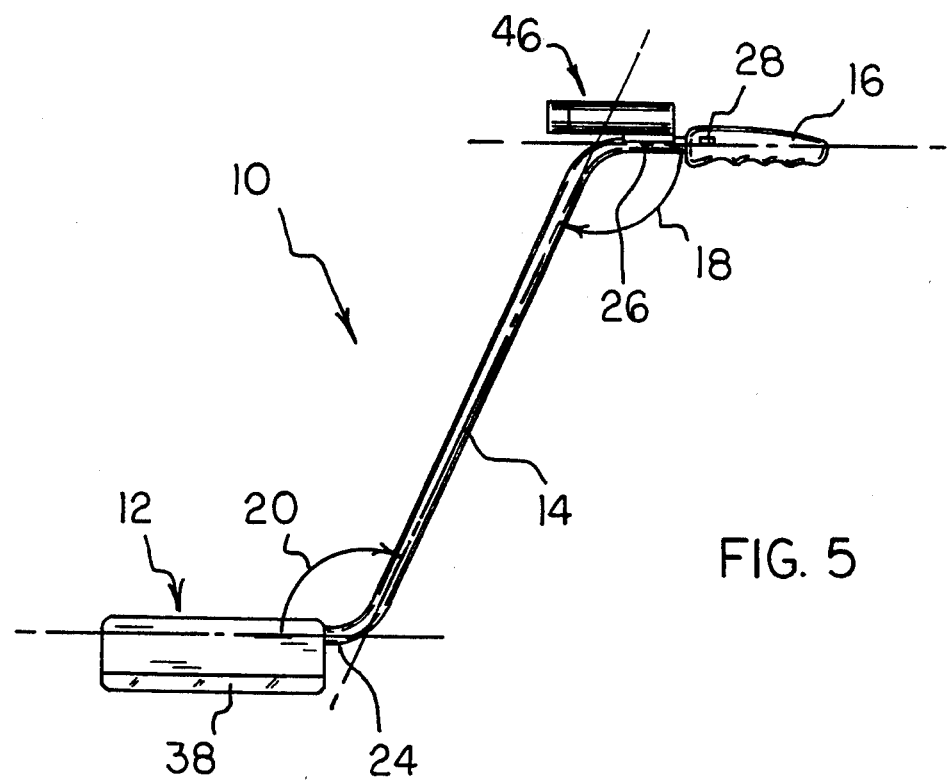
FIG. 5 is a side view of a second preferred embodiment of the golf ball/fluorescent object locator of the invention which includes a source of visible light.
Figure 6:
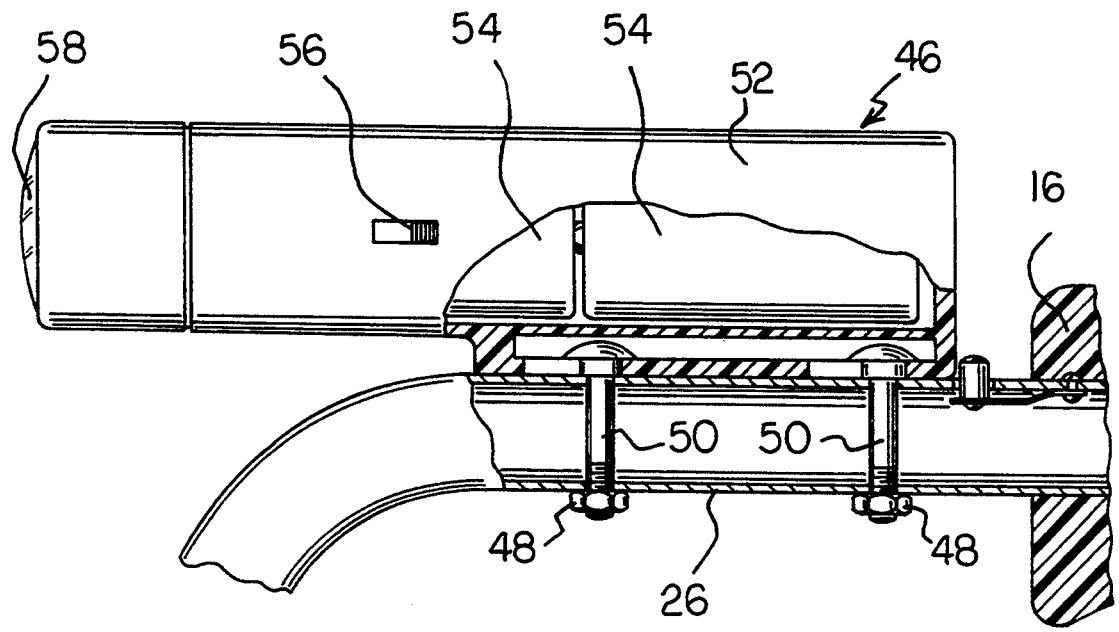
FIG. 6 is an enlarged view, partially in cross section, of a portion of the visible light source shown in FIG. 5.

Turning to FIGS. 5-6, a second embodiment of the invention is shown. Reference numerals are shown that correspond to like reference numerals that designate like elements shown in the other figures. In addition, a visible light source assembly 46, supported by the rigid support member 14, provides visible light. The visible light source assembly 46 is connected to the rear portion 26 of the rigid support member 14. Nuts 48 and bolts 50 are used to connect the visible light source assembly 46 to the rear portion 26 of the rigid support member 14 next to the handle member 16. The visible light source assembly 46 is supported in a plane that is parallel to a plane in which the handle member 16 is located. The visible light source assembly 46 is a battery-powered flashlight which includes housing 52, batteries 54, on/off switch 56, and lens 58.

Figure 7:
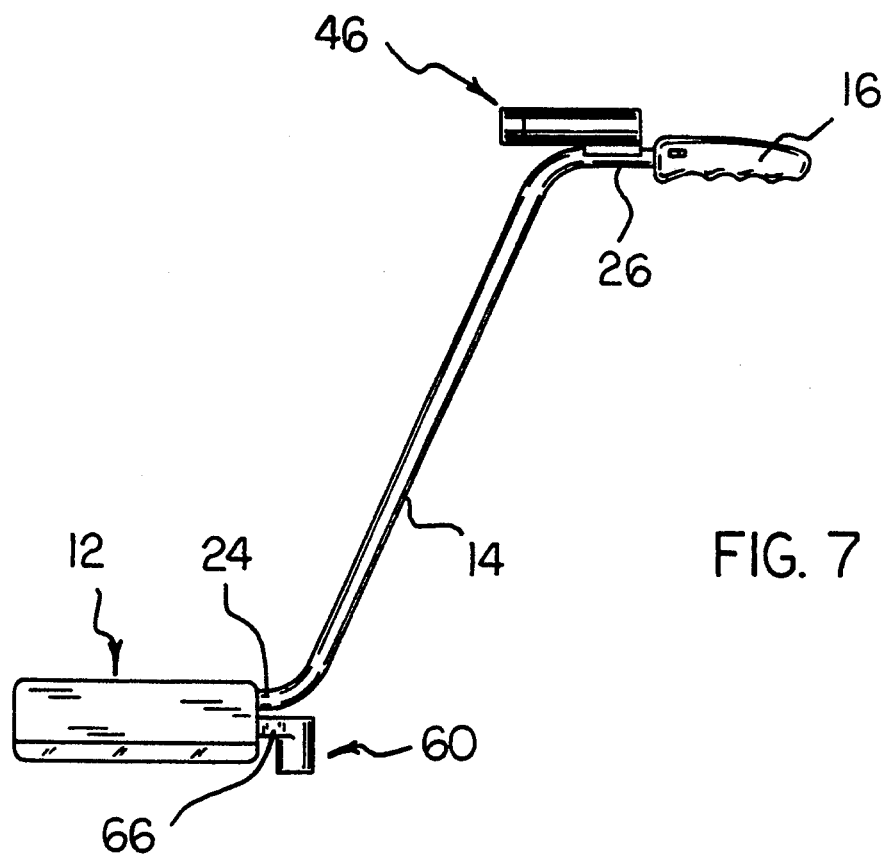
FIG. 7 is a side view of a third preferred embodiment of the golf ball/fluorescent object locator of the invention which includes an assembly for picking up found golf balls.
Figure 8:
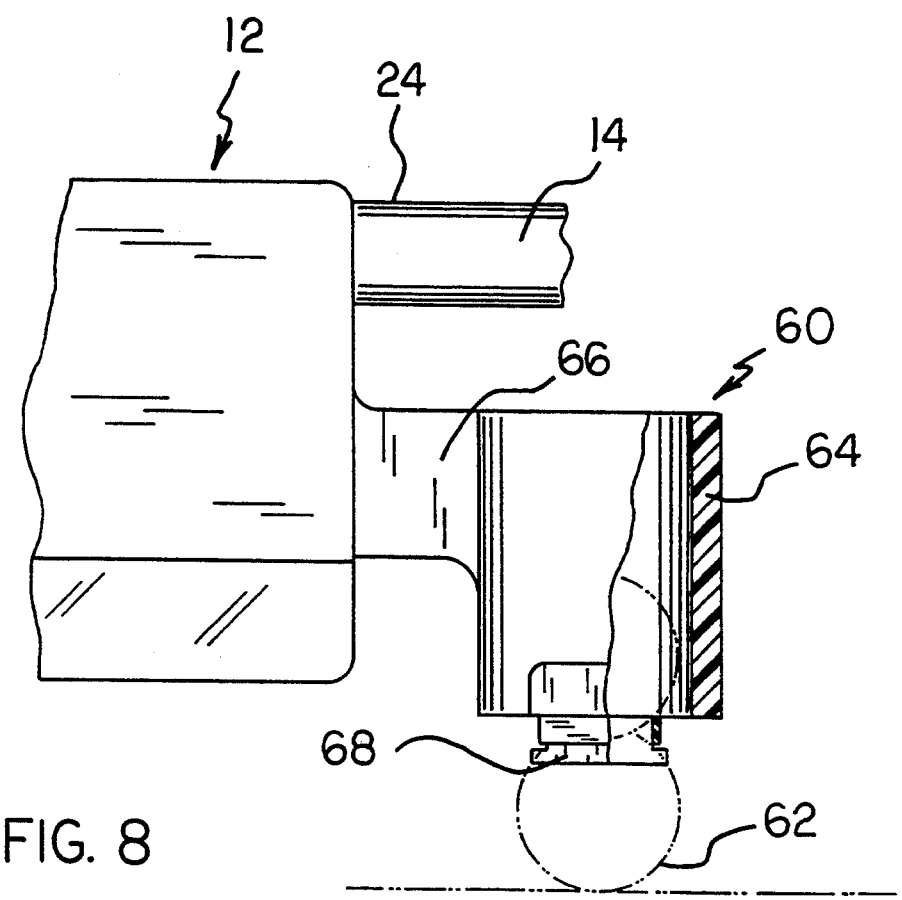
FIG. 8 is an enlarged, partial side view, partially in cross section, of the assembly for picking up golf balls shown in FIG. 7.

Turning to FIGS. 7-8, a third embodiment of the invention is shown. Reference numerals are shown that correspond to like reference numerals that designate like elements shown in the other figures. In addition, a ball recovery assembly 60, connected to the UV light source assembly 12, is used for lifting and retaining a ball 62. Thee ball recovery assembly 60 includes a housing 64 and a support strut 66 connected between the housing 64 and the UV light source assembly 12 for supporting the ball recovery assembly 60 on the UV light source assembly 12. An expandable, resilient valve member 68 is located at a bottom portion of tile housing 64. The valve member 68 is capable of being in a relaxed state and in a stretched state, such that a ball 62 can be pressed against the valve member 68 when in a relaxed state. The ball 62 can stretch the valve member 68 to the stretched state. The ball 62 can pass through the valve member 68 in the stretched state, and the valve member 68 can return to the relaxed state, whereby the ball 62 is retained within the housing 64 of the ball recovery assembly 60 by the valve member 68 in the relaxed state. The housing 64 can retain a plurality of balls 62. Pressure exerted on the expandable, resilient valve member 68 by the ball 62 results from weight of the UV light source assembly 12 bearing down on the ball 62 when the ball 62 is positioned next to and under the expandable, resilient valve member 68.

The golf ball/fluorescent object locator of the invention works best under low light conditions and is especially effective after dark. Even golf balls lost in heavy cover can be found easily. However, the invention does not cause golf balls immersed in water to fluoresce. The UV light of the invention causes the golf balls to glow, and the magnitude of the glow is directly proportional to the intensity of the UV light. Even low intensity UV light sources, such as a 4-watt bulb, are highly effective.

The components of the golf ball/fluorescent object locator of the invention can be made from inexpensive and durable metal or plastic materials. The golf ball/fluorescent object locator of the invention can be made small enough to fit into a golf bag or on a cart. Larger variations of the invention are also possible for commercial use.

It is apparent from the above that the present invention accomplishes all of the objects set forth by providing a new and improved golf ball/fluorescent object locator that is low in cost, relatively simple in design and operation, and which may advantageously be used to locate lost golf balls in low light level conditions such as dusk or night time. With the invention, a golf ball/fluorescent object locator is provided which does not depend upon the use of internally illuminated golf balls. With the invention, a golf ball/fluorescent object locator is provided which does not use glass beads applied to the ball. With tile invention, a golf ball/fluorescent object locator is provided which provides a source of UV light that is close to the ground. With the invention, a golf ball/fluorescent object locator is provided which directs UV light toward the ground and away from a user's eyes. In this way, a golf ball/fluorescent object locator is provided which provides a UV light source which minimizes the exposure of a user's eyes to the UV light. With the invention, a golf ball/fluorescent object locator is provided which has controls for the UV light source located in a hand-held device. With the invention, a golf ball/fluorescent object locator is provided which contains both a UV light source and a source of visible light. With the invention, a golf ball/fluorescent object locator is provided which permits the user to retrieve a found ball without bending down and without letting go of the handle of the UV light source. With the invention, a golf ball/fluorescent object locator is provided which permits retrieval of more than one golf ball without bending down and without letting go of the handle of the UV light source. With the invention, a golf ball/fluorescent object locator is provided which has a handle which positions the UV light source a few feet in front of the user. With the invention, a golf ball/fluorescent object locator is provided which is useful generally for locating objects that fluoresce upon exposure to UV light.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved fluorescent object locator, comprising:
    a UV light source assembly,
    a rigid support member, connected to said UV light source assembly and extending upward and rearward from said UV light source assembly, and
    a handle member, connected to said rigid support member, for permitting said UV light source assembly to be controlled by a person holding said handle member,
    wherein
    said rigid support member extends downward and forward from said handle member toward said UV light source assembly at a first predetermined angle with respect to said handle member, said rigid support member extends upward and rearward from said UV light source assembly toward said handle member at a second predetermined angle with respect to said UV light source assembly, and
    said first predetermined angle and said second predetermined angle are selected such that said UV light source assembly and said handle member are located in parallel planes.

2. The apparatus described in claim 1 wherein said UV light source assembly includes:
    a housing connected to said rigid support member, a battery assembly housed within said housing,
    a UV source powered by said battery assembly and housed within said housing, and
    a UV transparent lens structure, attached to said housing at a bottom portion of said housing, for permitting UV light to pass from said UV source to outside said UV light source assembly to below said UV light source assembly.

3. The apparatus described in claim 2 wherein said battery assembly includes rechargeable batteries.

4. The apparatus described in claim 2, further including:
    a reflector assembly, positioned above and behind said UV source, for reflecting UV light through said UV transparent lens structure to outside said UV light source assembly.

5. The apparatus described in claim 1 wherein said first predetermined angle and said second predetermined angle are equal to each other.

6. The apparatus described in claim 1 wherein said first predetermined angle and said second predetermined angle are approximately 135 degrees.

7. The apparatus described in claim 1 wherein said rigid support member includes a front portion which is located in a plane parallel to a plane in which said UV light source assembly is located.

8. The apparatus described in claim 1 wherein said rigid support member includes a rear portion which is located in a plane parallel to a plane in which said handle member is located.

9. The apparatus described in claim 1, further including:
    a visible light source assembly, supported by said rigid support member, for providing visible light.

10. The apparatus described in claim 9 wherein said visible light source assembly is connected to said rear portion of said rigid support member.

11. The apparatus described in claim 9 wherein said visible light source assembly is supported in a plane that is parallel to a plane in which said handle member is located.

12. The apparatus described in claim 9, wherein said visible light source assembly is a battery-powered flashlight.

13. A new and improved fluorescent object locator, comprising:
    a UV light source assembly,
    a rigid support member, connected to said UV light source assembly and extending upward and rearward from said UV light source assembly, and
    a handle member, connected to said rigid support member, for permitting said UV light source assembly to be controlled by a person holding said handle member.
    further including:
    a ball recovery assembly, connected to said UV light source assembly, for lifting and retaining a ball,
    wherein said ball recovery assembly includes:
    a housing,
    a support strut connected between said housing and said UV light source assembly for supporting said ball recovery assembly on said UV light source assembly,
    an expandable, resilient valve member, located at a bottom portion of said housing, said valve member capable of being in a relaxed state and in a stretched state, such that a ball can be pressed against said valve member when in a relaxed state, the ball can stretch said valve member to the stretched state, the ball can pass through said valve member in the stretched state, and said valve member can return to the relaxed state, whereby the ball is retained within said housing of said ball recovery assembly by said valve member in the relaxed state.

14. The apparatus described in claim 13 wherein said housing can retain a plurality of balls.

15. The apparatus described in claim 13 wherein pressure exerted on said expandable, resilient valve member by the ball results from weight of said UV light source assembly bearing down on the ball when the ball is positioned next to and under said expandable, resilient valve member.

* * * * *